3,010,872
5-ARYLSULFONAMIDO-3-SUBSTITUTED 1,2,4-THIODIAZOLE DERIVATIVES AND THEIR THERAPEUTIC USE
Udo Wörffel, Walter Puls, and Robert Behnisch, all of Wuppertal-Elberfeld, Germany, and Fritz Mietzsch, deceased, late of Wuppertal-Elberfeld, Germany, by Gerta Mietzsch, heiress, Wuppertal-Elberfeld, Germany, assignors to Farbenfabriken Bayer Aktiengesellschaft, Leverkusen, Germany, a corporation of Germany
No Drawing. Filed Sept. 30, 1959, Ser. No. 843,907
Claims priority, application Germany Dec. 10, 1957
19 Claims. (Cl. 167—51.5)

This invention relates to and has as its object the production of novel derivatives of 5-arylsulfonamido-3-substituted 1,2,4-thiodiazoles, which have been found to constitute therapeutically useful compounds. The invention is a continuation-in-part of application Serial No. 778,642, filed December 8, 1958, now abandoned.

The novel 5-arylsulfonamido-1,2,4-thiodiazoles of the present invention have the general formula

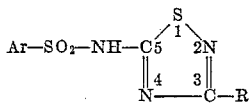

in which Ar represents a phenyl radical substituted with at least one lower alkyl radical containing 1–2 carbon atoms or with a lower alkoxy radical containing from 1–4 carbon atoms and R represents an alkyl radical containing 1–4 carbon atoms, an alkoxyalkyl radical containing up to 4 carbon atoms, a methylmercapto, a phenyl or a benzyl group.

The novel 5-arylsulfonamido-1,2,4-thiodiazoles in accordance with the invention may be produced by reacting a 5-halo-1,2,4-thiodiazole, which is substituted in position with an arylsulfonamide substituted with at least one lower alkyl or alkoxy group in its aryl radical in the form of its salt or in free form, in the presence of acid acceptors.

The starting 5-halo-1,2,4-thiodiazoles may be obtained in accordance with the method described in Chemische Berichte 90 (1957), pages 182–187.

Alternately, the novel 5-arylsulfonamido-1,2,4-thiodiazoles may be produced by reacting a 5-amino-1,2,4-thiodiazole which is substituted in the 3-position with a reactive functional derivative of arylsulfonic acids, substituted with at least one lower alkyl or alkoxy groups in its aryl radical in the presence of acid acceptors. Examples of functional derivatives suitable for the purposes of this reaction are the acid chlorides, acid bromides, acid fluorides and the acid azides.

The starting 5-amino-1,2,4-thiodiazole may be obtained in accordance with the method described in Chemische Berichte 87 (1954), pages 57–67.

As acid acceptors the following have been found suitable: the trialkylamines, pyridine, potassium carbonate and sodium carbonate.

The novel 5-arylsulfonamido-1,2,4-thiodiazoles so obtained are highly effective in acute and chronic liver disease and are highly useful for pharmaceutical purposes in improving liver function where the same has been impaired. The 5-arylsulfonamido-1,2,4-thiodiazoles differ from the known sulfonamides in that they exhibit neither bacteriostatic nor diuretic activity, nor do they act to depress the blood sugar level. The action of these compounds is principally hepatotropic.

The following examples are given by way of illustration and not limitation:

*Example 1*

222 g. (1.3 mols) of o-toluenesulfonamide, 179 g. (1.3 mols) of anhydrous potassium carbonate and 13 g. of copper powder are suspended in 1600 ml. of diphenyl ether. At a bath temperature of 200° C., 175 g. (1.3 mols) of 5-chloro-3-methyl-1,2,4-thiodiazole are slowly instilled with vigorous stirring in the course of 90 minutes. After another 4 hours of stirring, the mixture is cooled, diphenyl ether is decanted and the residue is dissolved in 1500 ml. of hot water. The solution is filtered over charcoal and acidified (pH 4–5), after which the crystalline precipitate is filtered off by suction. Upon recrystallization from acetic acid 25%, 5-(2'-methylbenzenesulfonamido)-3-methyl-1,2,4-thiodiazole precipitates in the form of colorless needles, melting at 170–171° C. in a yield of 225 g. (=64.5% of theory).

As successfuly as diphenyl ether, other high-boiling, inert diluents may be utilized, such as diphenyl, diphenylmethane, paraffin oil, decalin, tetraline, methyl- and chloronaphthalenes or mixtures of these substances.

Analogously, stoichiometric amounts of m-toluene- sulfonamide and 5-chloro-3-methyl-1,2,4-thiodiazole give 5 - (3-methylbenzenesulfonamido)-3-methyl-1,2,4-thiodiazole in crystals of M.P. 184–186° C.;

p-Toluenesulfonamide and 5-chloro-3-methyl-1,2,4-thiodiazole give 5 - (4'-methylbenzenesulfonamido)-3-methyl-1,2,4-thiodiazole of M.P. 223–225° C.;

o-Toluenesulfonamide and 5-chloro-3-ethyl-1,2,4-thiodiazole give 5-(2'-methylbenzenesulfonamido)-3-ethyl-1,2,4-thiodiazole of M.P. 129–130° C.;

p-Toluenesulfonamide and 5-chloro-3-ethyl-1,2,4-thiodiazole give 5(4'-methylbenzenesulfonamido)-3-ethyl-1,2,4-thiodiazole of M.P. 175–176° C.;

o-Toluenesulfonamide and 5-chloro-(3-β-ethoxyethyl)-1,2,4-thiodiazole give 5-(2'-methylbenzenesulfonamido)-3-(β-ethoxyethyl)-1,2,4-thiodiazole of M.P. 64–65° C.;

o-Toluenesulfonamide and 5-chloro-3-benzyl-1,2,4-thiodiazole give 5-(2'-methylbenzenesulfonamido)-3-benzyl-1,2,4-thiodiazole of M.P. 161–162° C.;

o-Toluenesulfonamide and 5-chloro-3-methylmercapto-1,2,4-thiodiazole give 5-(2'-methylbenzenesulfonamido)-3-methylmercapto-1,2,4-thiodiazole of M.P. 96–98° C.;

p-Toluenesulfonamide and 5-chloro-3-methylmercapto-1,2,4-thiodiazole give 5-(4'-methylbenzenesulfonamido)-3-methylmercapto-1,2,4-thiodiazole of M.P. 167–168° C.;

2-ethylbenzenesulfonamide and 5-chloro-3-methyl-1,2,4-thiodiazole give 5 - (2'-ethylbenzenesulfonamido)-3-methyl-1,2,4-thiodiazole of M.P. 152–153° C.;

2-ethylbenzenesulfonamide and 5-chloro-3-ethyl-1,2,4-thiodiazole give 5-(2'-ethylbenzenesulfonamido)-3-ethyl-1,2,4-thiodiazole of M.P. 120° C.;

p-Toluenesulfonamide and 5-chloro-3-benzyl-1,2,4-thiodiazole give 5-(4'-methylbenzenesulfonamido)3-benzyl-1,2,4-thiodiazole of M.P. 203–204° C.;

p-Toluenesulfonamide and 5-chloro-3-(β-ethoxyethyl)-1,2,4-thiodiazole give 5-(4'-methylbenzenesulfonamido)-3-(β-ethoxyethyl)-1,2,4-thiodiazole of M.P. 141–142° C.;

o-Toluenesulfonamide and 5-chloro - 3 - (β-methoxyethyl)-1,2,4-thiodiazole give 5-(2'-methylbenzenesulfonamido)-3-(β-methoxylethyl)-1,2,4-thiodiazole of M.P. 74–75° C.

5-chloro-3-methylmercaptane-1,2,4-thiodiazole may be obtained in accordance with the method described in Chemische Berichte 90 (1957), pages 892-901.

5-chloro-3-β-ethoxyethyl-1,2,4-thiodiazole, B.P. 105–106° C., 13 mm. Hg, may be obtained in analogy with the method described in Chemische Berichte 90 (1957), pages 182–187 by reacting the β-ethoxy-propamidine-hydrochloride (obtained from β-ethoxy-propionitrile) with perchloromethylmercaptane.

5-chloro-3-(β-methoxyethyl)-1,2,4-thiodiazole, B.P. 96–98° C., 14 mm. Hg, may be obtained in analogy with the method described in Chemische Berichte 90 (1957), pages 182–187, by reacting β-methoxypropamidine-hydrochloride (obtained from β-methoxypropionitrile) with perchloromethylmercaptane.

*Example 2*

A solution of 12.9 g. of 5-amino-3-ethyl-1,2,4-thiodiazole in 60 ml. of pyridine is mixed incrementally, while cooling with ice, with 19 g. of o-toluenesulfochloride. The mixture is kept at 20° C. for 8 hours and, during 30 minutes, is heated to 50° C. Excess pyridine is then evaporated under vacuum, and the residue is digested with 10% hydrochloric acid, causing the initially oily mass to solidify slowly in crystalline form. The precipitate is filtered off by suction, dissolved in dilute aqueous ammonia and filtered over charcoal. Acidification of the filtrate yields 5-(2'-methylbenzenesulfonamido)-3-ethyl-1,2,4-thiodiazole in colorless crystals of M.P. 129° C.

In analogous fashion, 5-amino-3-phenyl-1,2,4-thiodiazole and o-toluenesulfochloride and p-toluenesulfochloride, respectively, give 5-(2'-methylbenzenesulfonamido)-3-phenyl-1,2,4-thiodiazole of M.P. 214–216° C. and 5-(4'-methylbenzenesulfonamido)-3-phenyl-1,2,4-thiodiazole of M.P. 224–225° C., respectively.

*Example 3*

34.5 g. (0.185 mol) of p-methoxybenzenesulfonamide, 26 g. of anhydrous potassium carbonate and 2 g. of copper powder are suspended in 200 cc. of diphenyl ether. At a bath temperature of 200° C., 25 g. (0.185 mol) of 5-chloro-3-methyl-1,2,4-thiodiazole is slowly instilled while vigorously stirring. After 5 hours of stirring, the batch is cooled, the diphenyl ether is decanted and the residue is dissolved in hot water. The solution is filtered through charcoal, acidified to pH 4–5 and the crystalline precipitate filtered off by vacuum. Recrystallization from 25% acetic acid gives 5-(4'-methoxybenzenesulfonamido)-3-methyl-1,2,4-thiodiazole in the form of colorless crystals, which melt at 184.5–185.5° C.

As successfully as diphenyl ether, other high-boiling inert diluents may be utilized, such as diphenyl, diphenyl methane, paraffin oil, decalin, tetralin, methyl- and chloronaphthalenes or mixtures of these diluents.

In analogous fashion, 5-(4'-ethoxybenzesulfonamido)-3-methyl-1,2,4-thiodiazole of M.P. 165° is obtained from p-ethoxybenzenesulfonamide and 5-chloro-3-methyl-1,2,4-thiodiazole;

5-(4'-butoxybenzenesulfonamido)-3-methyl-1,2,4-thiodiazole of M.P. 178° C. is obtained from p-butoxybenzenesulonamide and 5-chloro-3-methyl-1,2,4-thiodiazole;

5-(4'-methoxybenzenesulfonamido)-3-ethyl-1,2,4-thiodiazole of M.P. 170–171° C. is obtained from p-methoxybenzenesulfonamide and 5-chloro-3-ethyl-1,2,4-thiodiazole;

5-(4'-ethoxybenzenesulfonamido)-3-ethyl-1,2,4-thiodiazole of M.P. 152–153° C. is obtained from p-ethoxybenzenesulfonamide and 5-chloro-3-ethyl-1,2,4-thiodiazole.

*Example 4*

A solution of 11.5 g. (0.1 mol) of 5-amino-3-methyl-1,2,4-thiodiazole in 75 ml. of pyridine is mixed incrementally, while cooling with ice, with 20.5 g. (0.1 mol) of p-methoxybenzenesulfochloride. The mixture is kept at 20° C. for 8 hours and then heated to 50° C. for 30 minutes. The pyridine is evaporated under vacuum, the residue is digested with a 10% hydrochloric acid, and the initially oily mass slowly congeals in crystalline form. The precipitate is filtered off by vacuum, dissolved in dilute aqueous ammonia and filtered through charcoal. Acidification to pH 4–5 yields 5-(4'-methoxybenzenesulfonamido)-3-methyl-1,2,4-thiodiazole, which forms crystals of M.P. 183–184° C.

Experimental studies were carried out in order to demonstrate the ability of the 5-aryl-sulfonamido-1,2,4-thiodiazoles to improve the functional capacity of the damaged liver.

The rate of excretion by the liver of the dye bromsulphalein was employed as a measure of the functional capacity of the liver. The bromsulphalein excretion tests were performed in rats whose livers had been experimentally damaged by subjecting the animals to treatment with carbon tetrachloride. The rats prepared in this manner were fed in groups per os the 5-(2'-methylbenzenesulfonamido)-3-methyl-1,2,4-thiodiazole in the amounts as indicated in the following figure, and the rats' excretion of injected bromsulphalein was determined. Bromsulphalein excretion in normal rats was taken as 100% and that of rats with damaged livers treated only with normal saline as 0%. The results of such determination may be seen in the following figure and indicate that an 80% excretion is obtainable with the highest dose level. This indicates a considerable and functional improvement in liver capacity due to the oral administration of the 5-arylsulfonamido-3-substituted 1,2,4-thiodiazole derivative.

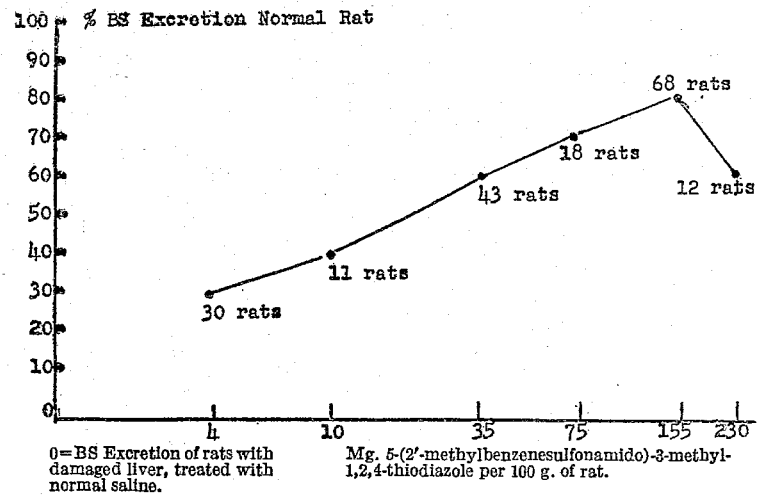

Functional improvement of the liver was evaluated by determination of the enzymatic activity of fructose-1,6-diphospho-aldolase in the serum of the rat. It has been established that the results of such determinations are directly related to the degree of damage to the liver parenchyma. The level of serum aldolase activity was accordingly determined in normal rats, in rats with experimentally damaged livers and in the rats with damaged livers who had been treated with 5-(2'-methylbenzenesulfonamido)-3-methyl-1,2,4-thiodiazole. The serum aldolase activity of the untreated animals with liver damage was calculated as 100% and the serum aldolase activity of normal rats and the rats with liver damage treated with the 5-(2'-methylbenzenesulfonamido)-3-methyl-1,2,4-thiodiazole calculated accordingly. The results can be seen in the following figure and demonstrate a considerable decline in activity to almost the normal level as the result of the treatment.

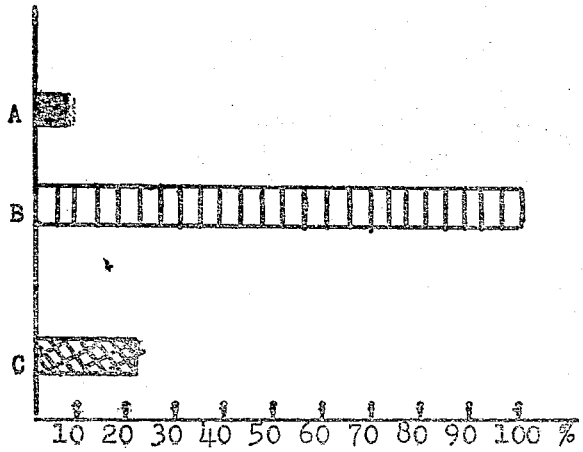

Fructose-1,6-diphospho-aldolase activity in serum
A = Normal rats.
B = Untreated rats with damaged liver.
C = Rats with damaged liver, treated with 5-(2'-methylbenzenesulfonamido)-3-methyl-1,2,4-thiodiazole.

Additionally, improvement of the liver following treatment was established by histological examination of the normal animal liver, the untreated damaged liver and the liver of the damaged animal treated with a derivative of 5-arylsulfonamido-3-substituted 1,2,4-thiodiazole. In contrast to the normal liver, the damaged liver exhibited extensive central necrosis, the said areas of necrosis being considerably reduced in the livers of the treated animals.

The compounds have been administered to man, and there has been observed an improvement in the general subjective condition and in the appetite of the subject. Objectively, an abrupt improvement in excretory liver function, as determined in accordance with the Zimmer two-dye method, has been established. A considerably accelerated fall in the serum bilirubin level with almost complete disappearance of icterus in subjects suffering with acute and chronic hepatitis follows treatment with the compounds of the invention. Electrophoretic investigation of the serum protein fractions in cases of chronic hepatitis showed a return to normal of the serum protein values, although this normalization did not take place as rapidly as the other noted improvements.

The results of the experimental studies suggest that the 5-arylsulfonamido-3-substituted 1,2,4-thiodiazole derivatives act upon the liver cell, and the compounds are therefore believed to be indicated in all liver diseases involving cell damage and in those conditions in which the parenchymatous involvement is greater than that of the mesenchymal involvement. Such conditions include acute hepatitis, acute attacks of chronic hepatitis, outbreaks of necrosis in cirrhosis of the liver and hepatic coma.

The 5-arylsulfonamido-3-substituted 1,2,4-thiodiazole derivatives are administered orally in the form of 0.1 and 0.25 g. tablets. Oral doses of 0.25 g., 3 times daily, have proven highly effective. The compounds may also be injected intravenously, a 10% solution being prepared and an amount of 0.5 g. of compound being administered in this fashion.

We claim:
1. A 5-arylsulfonamido-3-substituted 1,2,4-thiodiazole having the general formula

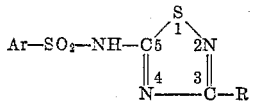

in which Ar represents a phenyl radical substituted with a member selected from the group consisting of methyl, ethyl and alkoxy radicals having from 1 to 4 carbon atoms and R represents a member selected from the group consisting of alkyl radicals having up to 4 carbon atoms, alkoxyalkyl radicals having up to 4 carbon atoms, methylmercapto, phenyl and benzyl radicals.

2. 5-(2'-methylbenzene-sulfonamido)-3-methyl-1,2,4-thiodiazole.

3. 5-(4'-methylbenzene-sulfonamido)-3-methyl-1,2,4-thiodiazole.

4. 5-(2'-methylbenzene-sulfonamido)-3-ethyl-1,2,4-thiodiazole.

5. 5-(2'-methylbenzene-sulfonamido)-3-(β-ethoxyethyl)-1,2,4-thiadiazole.

6. 5-(2'-methylbenzene-sulfonamido)-3-benzyl-1,2,4-thiodiazole.

7. 5-(4'-methoxybenzene-sulfonamido)-3-methyl-1,2,4-thiodiazole.

8. Process for the production of 5-aryl-sulfonamido-3-substituted 1,2,4-thiodiazoles, which comprises contacting a 5-halo-3-substituted 1,2,4-thiodiazole having the general formula

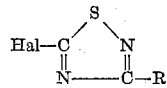

wherein R is a member selected from the group consisting of alkyl, alkoxyalkyl, alkylmercapto, aryl and aralkyl radicals with an arylsulfonamide substituted with a member selected from the group consisting of methyl, ethyl and alkoxy radicals having from 1–4 carbon atoms in its aryl radical in the presence of an acid acceptor.

9. Process as defined in claim 8, in which said arylsulfonamide is in the form of its salt.

10. Process as defined in claim 8, in which said contacting is effected at an elevated temperature.

11. Process as defined in claim 8, in which said contacting is effected in the presence of a diluent.

12. A method of treating liver disease, which comprises administering to the subject suffering from such disease at least a therapeutic amount of a 5-arylsulfonamide-3-substituted 1,2,4-thiodiazole having the general formula

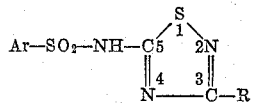

in which Ar represents a phenyl radical substituted with a member selected from the group consisting of methyl, ethyl and alkoxy radicals having from 1–4 carbon atoms and R represents a member selected from the group consisting of alkyl radicals having up to 4 carbon atoms, alkoxyalkyl radicals having up to 4 carbon atoms, methylmercapto, phenyl and benzyl groups in dosage unit form.

13. A composition of matter in dosage unit form, suitable for oral and intravenous administration to a subject suffering from liver disease, comprising at least a therapeutic amount of a 5-arylsulfonamido-3-substituted 1,2,4-thiodiazole having the general formula

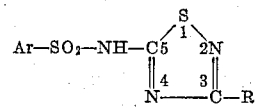

in which Ar represents a phenyl radical substituted with a member selected from the group consisting of methyl, ethyl and alkoxy radicals having from 1–4 carbon atoms and R represents a member selected from the group consisting of alkyl radicals having from 1–4 carbon atoms, alkoxyalkyl radicals having up to 4 carbon atoms, methylmercapto, phenyl and benzyl groups.

14. A composition of matter according to claim 13 in dosage unit form, suitable for oral administration to a subject suffering from liver disease, in which said composition is in tablet form.

15. A composition of matter according to claim 14 in dosage unit form, suitable for oral administration to a subject suffering from liver disease, in which said tablet contains 0.25 g. of said composition.

16. A composition of matter according to claim 13 in dosage unit form, suitable for intravenous administration to a subject suffering from liver disease, in which said intravenous preparation is in the form of a 10% solution of said composition.

17. 5-(2'-methylbenzenesulfonamido) - 3 - methylmercapto-1,2,4-thiodiazole.

18. 5-(2'-ethylbenzenesulfonamido) - 3 - methyl-1,2,4-thiodiazole.

19. 5-(2'-ethylbenzenesulfonamido) - 3 - ethyl-1,2,4-thiodiazole.

No references cited.